J. SAWYER.
MITER PLANE.
No. 60,265.  Patented Dec. 4, 1866.
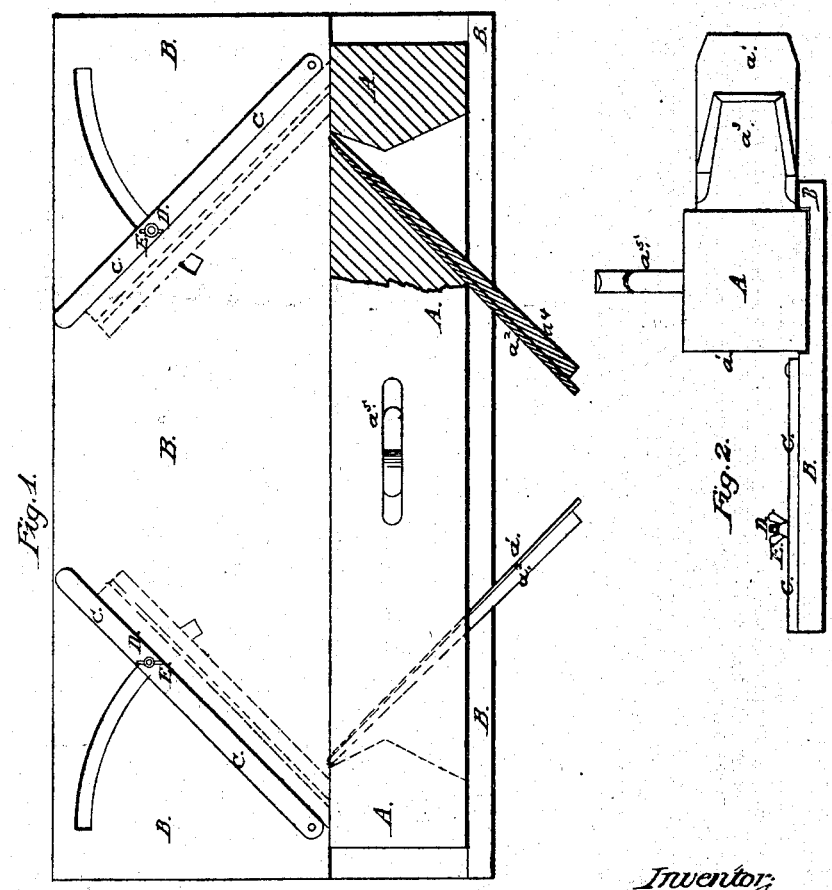

United States Patent Office.

IMPROVEMENT IN MITRE PLANES.

JOHN SAWYER, OF MORAVIA, NEW YORK.

Letters Patent No. 60,265, dated December 4, 1866.

SPECIFICATION.

TO ALL WHOM IT MAY CONCERN:

Be it known that I, JOHN SAWYER, of Moravia, in the county of Cayuga, and State of New York, have invented a new and useful Improvement in Plane; and I do hereby declare that the following is a full, clear, and exact description thereof, which will enable others skilled in the art to make and use the same, reference being had to the accompanying drawings, forming part of this specification, in which—

Figure 1 is a top view of my improved plane and guide-plate, part being broken away to show the construction.

Figure 2 is an end view of the same.

Similar letters of reference indicate like parts.

My invention has for its object to furnish an improved apparatus by means of which the ends of mouldings may be cut at any desired bevel so as to make a close joint; and it consists, first, in the plane, constructed and arranged as hereinafter more fully described; and, second, in the adjustable guide-plate, in combination with the plane, said guide-plate being constructed and arranged as hereinafter more fully described.

A is the plane, which is furnished with two plane-irons, $a^1$ and $a^2$, placed, one in each end of the plane and inclined in opposite directions, as shown in fig. 1. The cutting edges of these plane-irons, $a^1$ and $a^2$, project at the side of the plane, instead of projecting at the bottom, in the usual manner. The plane-irons $a^1$ and $a^2$ are set in grooves in the body of the plane, and are secured in place by wooden wedges, $a^3$ and $a^4$, in the ordinary way, a space being formed in front of said irons and wedges for the escape of the shavings. The handle, $a^5$, is attached to the central part of the upper side, as shown in fig. 1, and should be of such a form that the plane may be conveniently worked in either direction. B is the guide-plate, in connection with which the plane is used. The face of the plate B is grooved longitudinally near one edge, with a shallow groove of such a size that the lower face or side of the plane, A, may accurately fit into it, as shown in fig. 2, so that it may move in a direct line when operated. The depth of this groove should be such that the upper surface of the plate B may be in a line with the lower corner of the plane-irons, as shown in fig. 2. C are the guide-bars, against which the mouldings are held while being operated upon. These guide-bars, C, are pivoted at their inner ends to the plate B, and they are clamped at any angle to give any desired bevel to the ends of the moulding by the screws D and thumb-nuts E. The screws D pass through slots formed in the plate B, their heads fitting into a channel formed on the under side of said plate.

I claim as new, and desire to secure by Letters Patent—

The grooved and slotted plate B and pivoted guide-bars C, when used in combination with the plane A, having its iron, $a^1$ $a^2$, inclined in opposite directions, substantially as described for the purpose specified.

JOHN SAWYER.

Witnesses:
E. E. BROWN,
O. R. VAN ETTEN.